No. 876,037. PATENTED JAN. 7, 1908.
H. N. BINGHAM.
STRAW PRESS.
APPLICATION FILED JUNE 21, 1907.

2 SHEETS—SHEET 1.

Witnesses.
Lloyd Blackmore
D. W. Colton

Inventor.
H. N. Bingham
by
E. J. Featherstonhaugh atty.

No. 876,037. PATENTED JAN. 7, 1908.
H. N. BINGHAM.
STRAW PRESS.
APPLICATION FILED JUNE 21, 1907.

2 SHEETS—SHEET 2.

Witnesses.
Lloyd Blackmore
D. W. Colton.

Inventor.
H. N. Bingham
by E. J. Fetherstonhaugh
atty

UNITED STATES PATENT OFFICE.

HARVEY NELSON BINGHAM, OF McTAGGART, SASKATCHEWAN, CANADA.

STRAW-PRESS.

No. 876,037.　　　　　　Specification of Letters Patent.　　　　　Patented Jan. 7, 1908.

Application filed June 21, 1907. Serial No. 380,171.

*To all whom it may concern:*

Be it known that I, HARVEY NELSON BINGHAM, a subject of the King of Great Britain, and resident of the town of McTaggart, in the Province of Saskatchewan, in the Dominion of Canada, have invented certain new and useful Improvements in Straw - Presses, of which the following is a specification.

The invention relates to improvements in straw presses, as described in the present specification and shown in the accompanying drawings that form part of the same.

The invention consists essentially in the novel arrangement and construction of parts, whereby a reciprocating member exerts a prolonged pressure on the straw in the baling press at each operation.

The objects of the invention are to facilitate the making of the bales by steady compression of the straw thereby increasing the efficiency of the machine by reducing the racking incident to machines having a member operating on the straw by intermittent impacts, to lessen the number of complicated parts required and to do away with heavy fly wheels common to this class of machine and particularly associated with the operation of a plunger.

Figure 1:
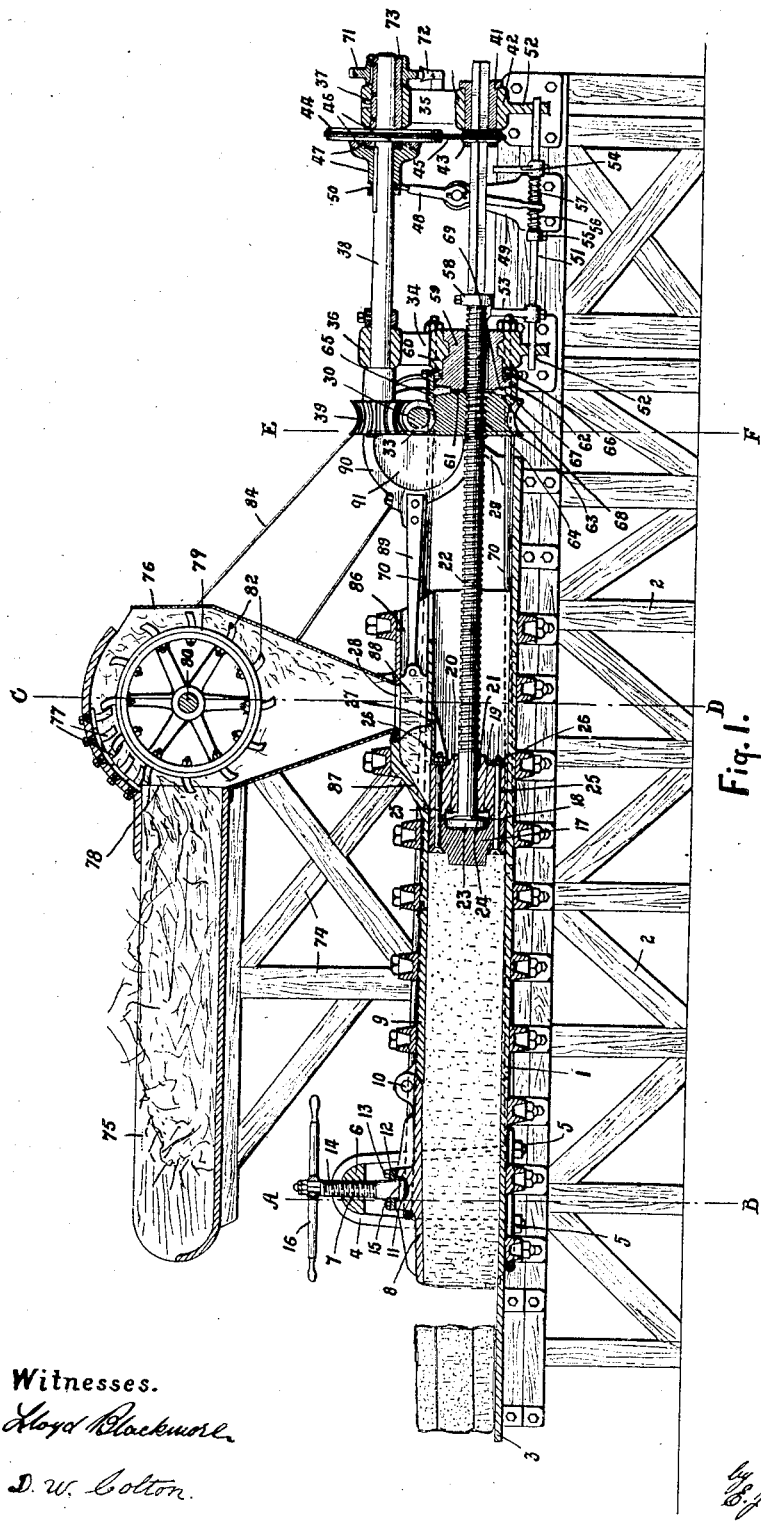
Figure 2:
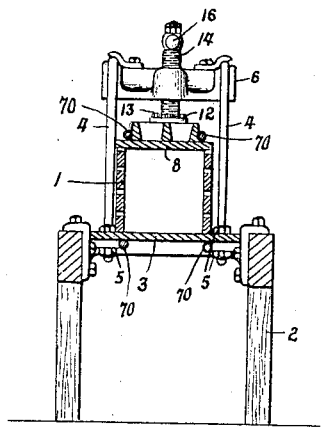
Figure 4:
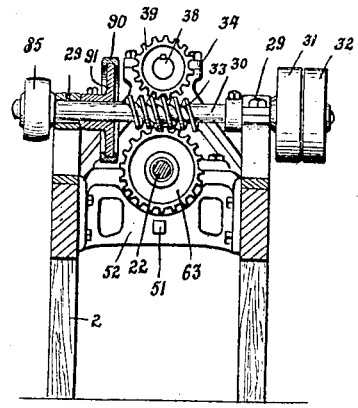
Figure 3:
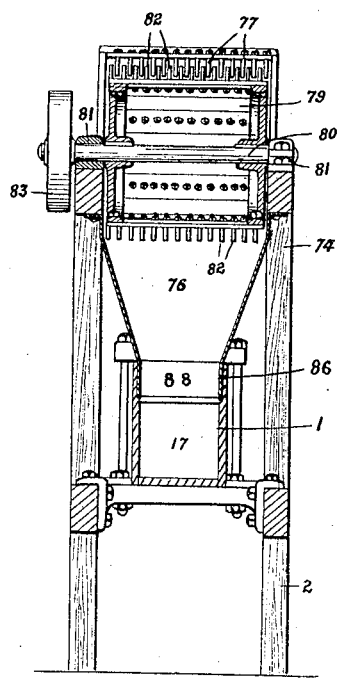
Figure 5:
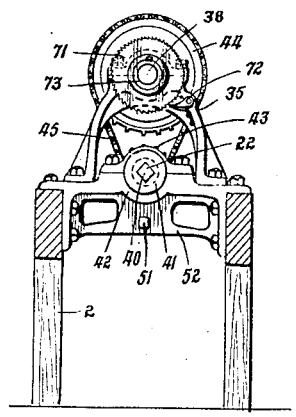

In the drawings, Figure 1 is a sectional side elevation of the machine. Fig. 2 is a cross sectional view through the line A—B in Fig. 1. Fig. 3 is a cross sectional view through the line C—D in Fig. 1. Fig. 4 is a cross sectional view through the line E—F in Fig. 1. Fig. 5 is an end elevation of the machine.

Like letters or numerals indicate corresponding parts in each figure.

The common practice in hay and straw presses is to have a plunger and a pitman suitably connected to a revolving member mounted on a rotating shaft so that at each revolution of the shaft the plunger comes in contact with the hay or straw in the baling press and at each impact as the fresh hay or straw is continuously fed into the press packs the stuff closer and closer. This means of pressing hay or straw is not only very imperfect, from the fact that the hay or straw is permitted to loosen up each time the plunger recedes therefrom, but from the fact that parts of such machines quickly loosen up, bolts drop out and generally the machine becomes very much racked, with the consequence that the maintenance charges are very heavy particularly in the loss of time occasioned by repairs.

In the present invention, the compressing member, that is the member having direct contact with the straw forces the head against the straw with steady progress and with positive movements.

Referring to the drawings, 1 is the baling press supported on the structure 2 and having the platform 3 supported by the same structure extending outwardly therefrom at the delivery end of said press.

4 are frames having their legs extending through suitable holes in the floor of the baling press 1 to each side of the path of the straw and having threaded lower ends and the nuts 5 secured on said ends.

6 is a cross piece having a central threaded orifice 7 therethrough and extending through the frames 4 at the upper end thereof and engaging the undersides of the upper ends of said frame.

8 is the hinged forward end of the upper side of the baling press 1, the said forward end being hinged to the rigid rear end 9 at 10.

11 is a socket formed centrally in the upper surface of the hinged forward end 8 and having a retaining ring 12 adapted to be secured therearound by the cap screws 13.

14 is a threaded spindle having the enlarged lower end 15 inserted in the socket 11 and held therein by the retaining ring 12 and turning freely in said socket. The spindle 14 extends through the threaded orifice 7 in the cross piece 6 and has at its upper end the lever handle 16. The spindle 14 turns in the threaded orifice 7 in the cross piece 6 and the forward end 8 of the upper side extends forwardly between the frames 4 consequently when the forward end of the said baling press 1 is filled with straw the lever handle 16 may be turned pressing the said forward end 8 downwardly on said straw until the machine is so adjusted as to regulate the size of the opening through which the bale, is to pass out from said press, that is to say, on the downward movement of the said forward end 8 a converging end portion is made to the baling press 1, which has the effect of further compressing the straw, as it is moved forward towards the delivery end. The rigid upper side 9 of the baling press 1 is securely supported from the structure below by heavy up-rights and cross pieces.

17 is a presser head split at 18 and having the recess 19 in the inner surface of the rear portion, the bed of said recess forming the bearing for the cone rollers 20, and 21 is a central orifice therethrough leading to said recess 19.

22 is a threaded shaft having a forward plain end extending through the central orifice 21 in the presser head 17 and a head 23 having the cone journal surface 24 bearing on the cone rollers 20.

25 are bolts extending through corresponding orifices in the forward and rear parts of the presser heads 17. The heads of said bolts 25 are counter-sunk in the front face of the said presser head. 26 are nuts placed on the other ends of the said bolts 25, the upper pair of said nuts 26 also holding the tail piece 27 on to the rear end of said presser head, said tail piece being used for the purpose as hereinafter more particularly set forth. The presser head slides forwardly and rearwardly between the upper and lower sides of the baling press 1, beyond the feed opening 28. The structure 2 extends rearwardly and beyond the baling press 1 and supports the laterally arranged bearings 29.

30 is the main shaft journaled in the bearings 29 and having belt connection to a suitable source of power through the fixed pulley 31, and 32 is a loose pulley turning on said shaft adjacent to said fixed pulley. The main shaft 30 has a worm 33 formed thereon centrally between the bearings 29.

34 and 35 are brackets supporting the bearings 36 and 37 at the rear end of the structure 2, said bearings being in longitudinal alinement.

38 is a shaft journaled in the bearings 36 and 37.

39 is a worm wheel fixedly secured to the forward end of the shaft 38 beyond the bearing 36 and meshing with the worm 33.

The rear end 40 of the threaded shaft 22 is squared and at its extremity extends through a correspondingly shaped orifice in the sleeve 41. The sleeve 41 is journaled in the bearing 42 rigidly supported at the back of the structure 2, thus completing forward and rear journal bearings for the shaft 22, as the said head 23 is free to turn in the recess 19.

43 is a sprocket wheel fixedly secured on the collar 41. 44 is a sprocket wheel of larger dimensions loosely journaled on the shaft 38 and connected with the sprocket wheel 43 by the chain 45.

46 are holes arranged in a circular row in the inner side face of the sprocket wheel 44.

47 is a clutch sliding on the shaft 38 and keyed thereto having suitable pins projecting therefrom adapted to engage in the holes 46 and throw the sprocket 44 into engagement.

48 is a lever pivoted in the bracket 49 having a suitable pin and roller extending into a suitable annular groove 50 in the clutch 47. The pivot lever 48 has a forked end straddling the square bar 51, the said bar 51 being slidably arranged in the brackets 52, said brackets being extensions from other parts secured to said structure.

53 and 54 are fingers adjusted to any suitable position on the bar 51 and rigid in the position set.

55 is a collar forming a stop on the bar 51.

56 and 57 are spiral springs encircling the bar 51 and normally holding the lower forked end of the pivot lever 48 mid-way between the finger 54 and the stop 55.

58 is a collar adjusted to the desired position on the squared end 40 of the shaft 22 and rigid in that position and adapted to engage one or other of the fingers 53 or 54 according to the direction of travel.

59 is a block set into the bracket 60 and rigid therewith and having an annular projecting surface 61 from the front end and the annular flange 62 at the edge of said annular surface.

63 is a worm wheel meshing with the worm 33 on the lower side thereof and having an internally threaded central orifice 64 corresponding to and turning on the threaded shaft 32, said worm wheel 33 having the rear annular projection 65.

66 is a retaining ring bolted to the rear annular projection 65 and extending inwardly therefrom behind the flange 62 and retaining said worm wheel 63 adjacent to the block 59 and in engagement with the worm 33, consequently the rotation of the said worm wheel 63 will impart to the shaft 22 a positive forward movement.

67 are cone rollers inserted between the annular bearing surfaces 68 and 69.

70 are tie rods connecting the bracket 60 to the extreme front end of the sides of the baling press.

71 is a ratchet wheel and 72 is a spring-held pawl engaging said ratchet wheel. The ratchet wheel 71 is rigidly secured to the sleeve 73, which is rigidly secured to the outer face of the sprocket 44, consequently preventing the reversing of said sprocket wheel on the sudden loosening of the clutch 47.

74 is an upper structure supported on the structure 2 and supporting the feed box 75 leading to the side opening into the hopper 76. 77 are teeth extending inwardly from the upper side of the hopper casing above the opening 78 to said feed box 75 and in lateral rows each tooth being spaced at a suitable distance from another. 79 is a drum fixedly mounted on the shaft 80, the said shaft extending through the sides of said hopper and being journaled in the bearings 81.

82 are teeth extending outwardly from the drum 79 in lateral rows spaced apart one from the other, so as to pass in between the teeth 77 extending inwardly from the hopper, consequently the straw fed into the feed box 75 will be caught by the teeth extending from the drum 79 and as the said straw lifted by said teeth, reaches the teeth 82, the said straw will be broken or chopped into very short lengths.

83 is a pulley fixedly secured on the extending end of the shaft 80 connected by a belt 84 to a pulley 85 fixedly mounted on the end of the main shaft 30.

The hopper 76 at its downward end opens into the chamber 86 arranged on the rigid rear end 9 of the upper side of the baling press, the feed opening 28 leading from the forward end of the chamber 86 into said baling press, said chamber having an inclined forward end 87 terminating at the front of said feed opening 28.

88 is a plunger operating in the chamber 86 and pivotally connected at its rear end to the eccentric rod 89, the eccentric rod being secured to the strap 90 encircling the eccentric 91 on the main shaft. The said eccentric rod 89 is suitably formed to place the eccentric 91 at a convenient place on the main shaft. The travel of the plunger 88 at each revolution of the main shaft shoves the straw coming down from above forward to the feed opening 28 and as that opening is closed during the forward movement of the presser head 17, the straw has its initial compression in said feed chamber 86, though this is not essential and the straw may pass through said chamber free in the rear position of the presser head 17, as the said straw cannot pass through in the forward position of said presser head, the tail piece 27 with said presser head completely closing the said feed opening 28.

In the operation of this machine, the straw is now forked into the feed box and into the opening to the hopper where it is lifted by the teeth extending from the drum until it comes in contact with the teeth extending from the inner side of the hopper casing. It is there broken into small pieces and carried around and dropped at the other side of the hopper to the lower end thereof and into the feed chamber on top of the baling press, the small plunger working in the feed chamber shoves the chopped straw along to the feed opening leading into the baling press. The presser head, which is in its rear position to begin with, is now brought into operation by the rotation of the main shaft. The rotation of the main shaft operates the worm wheels 39 and 63 causing the shaft 38 to revolve and the threaded shaft 22 to forge ahead and consequently push the presser head in the direction of the straw dropping into the baling press from the feed opening 28. At the limit of the forward movement of the threaded shaft 22 the collar 58 on the squared end of said threaded shaft engages the finger 53 and draws the bar 51 to its forward position. This has the effect of turning the pivoted lever 48 on its pivot with the result that the clutch 47 is thrown into engagement with the sprocket wheel 44. The shaft 38 which has been constantly rotating is now connected by the sprocket wheels 44 and 43 and the chain 45 to the rear end of the shaft 22 as the said sprocket wheel 43 is mounted on the collar forming the journal for the rear end of said shaft. The connection of these two shafts now insures the rapid rotation of the threaded shaft 22 in the reverse direction to that in which it has been rotating and as the speed of rotation is much greater than the speed of rotation of the worm wheel 63 the consequence is that the travel of the said shaft will be in a rearward direction. When the collar 58 reaches the finger 54 the bar 51 is moved to its rearward position which has the effect of turning the lever 48 on its pivot with the result that the clutch 47 is thrown from engagement with the sprocket wheel 44 thus said sprocket wheel becomes a loose wheel on the shaft 38 and the connection between said shaft 38 and the shaft 22 ceases to exist. The worm wheel 63 now causes the shaft 22 to forge ahead again and consequently the presser head and as the straw has been continually fed into the baling press through the feed opening 28 a quantity is collected which is shoved ahead by the said presser head. These operations are continued until the quantity of straw in the baling press is sufficient to collect in said baling press toward the end and the constant pressure of the additional straw being fed behind by the presser head compresses the straw in the forward end. So soon as the baling press becomes filled up there is always sufficient straw at the rear and front ends to effect a compression at each stroke of the shaft and presser head, that is to say a regular feed is established which adds continually to the straw in the press so as to about equal the amount delivered at the front end of the press. The presser head keeps up a constant delivery of the straw from the front end of the baling press and during the compressing process, said straw may be tied in bales as customary in this class of machine.

What I claim as my invention is:

1. In a straw press, the combination with a suitable structure and a baling press supported thereon, of a presser head exerting a prolonged pressure on the straw in said baling press at each operation, a rotating screw member reciprocating to the rear of said presser head and secured thereto, means for returning said member actuated at the extreme forward position of said member, and means at the extreme rear position of said member for checking said return movement and permitting the operation of said forward movement, substantially as described.

2. In a straw press, the combination with a suitable structure and a baling press supported thereon, of a presser head, a threaded shaft suitably connected with said presser head and adapted to turn therein and having a threaded portion to its length, a bearing for said shaft at the rear end thereof, a wheel having an internally threaded orifice therethrough corresponding to and turning on the thread of said shaft, means for causing the rotation of said wheel and means for rotating said shaft independently of said wheel, substantially as described.

3. In a straw press, the combination with a suitable structure and a baling press supported thereon, of a presser head, a shaft secured in said presser head and turning therein having a threaded portion to its length and suitably journaled at its rear end, a worm wheel having an internally threaded orifice therethrough corresponding to and turning on said threaded portion of the shaft, a main shaft journaled in suitable bearings in said structure and having a worm intermediate of its length operating the aforesaid worm wheel, and means operated by the rotation of said main shaft for rotating said threaded shaft in a reversed direction, substantially as described.

4. In a straw press, the combination with a suitable structure and a baling press supported thereon, of a presser head, a shaft secured in said presser head and turning therein and extending rearwardly therefrom and suitably journaled at the rear end and having a threaded portion to its length, a worm wheel having an internally threaded orifice therethrough mounted on said threaded portion of the shaft, a main shaft journaled in suitable bearings from said structure and having a worm intermediate of its length operating said worm wheel, a plurality of bearings extending upwardly from said structure and in longitudinal alinement, a shaft parallel to said threaded shaft and journaled in said bearings, a worm wheel mounted at the end of said parallel shaft and meshing with the worm of said main shaft and operated thereby, and means connecting said parallel shaft with said threaded shaft for returning said threaded shaft by its rapid rotation within said worm wheel through which it extends, substantially as described.

5. In a straw press, the combination with a suitable structure and a baling press supported thereon, of a split presser head having a recess in its forward portion and bolts longitudinally arranged therein holding said parts together, a threaded shaft extending through the rear part of said presser head and turning therein and having a head turning in the aforesaid recess, and a threaded portion extending from said presser head rearwardly and a squared portion extending from said threaded portion rearwardly, a bearing supported on said structure at the rear end thereof, a sleeve having a squared orifice therethrough, through which said squared end extends, said sleeve turning in said bearing, a collar secured on said squared end in proximity to said threaded portion, a sprocket fixedly mounted on said sleeve, a slidably arranged bar secured to said structure having fingers projecting upwardly therefrom to the forward and rear of said collar, a pivoted lever having a forked end straddling said slidable bar and spring-held to mid-position thereon, bearings extending upwardly from said structure and laterally arranged, a main shaft journaled in said lateral bearings and having a worm intermediate of its length, a worm wheel having an internally threaded orifice and mounted on said threaded shaft and turning thereon, bearings extending upwardly from said structure and in longitudinal arrangement and alinement, a shaft journaled in said longitudinally arranged bearings, a worm wheel mounted at the end of said shaft meshing with the worm on said main shaft, a sprocket wheel loosely mounted on said longitudinal shaft, a chain connecting said sprocket with the aforesaid sprocket, said sprocket on said longitudinal shaft having a sleeve extending outwardly therefrom, a clutch mounted on said longitudinal shaft and suitably keyed thereto and adapted to engage said sprocket wheel and having an annular groove into which the aforesaid pivoted lever extends, a ratchet secured to the sleeve extending outwardly from said sprocket and a pawl spring-held in engagement with said ratchet, substantially as described.

6. In a device of the class described, in combination, a baling press supported on a structure, a presser head traveling therein, a shaft threaded for a portion of its length and secured in and turning in said presser head and extending rearwardly therefrom suitably journaled at the rear end thereof, a main shaft supported in suitable bearings and having a worm intermediate of its length, a bracket supported on said structure, a thrust block supported in said bracket having an annular projecting surface and an annular flange extending outwardly from said annular surface, a worm wheel having an internally threaded central orifice therethrough mounted on said threaded portion of the presser head shaft and operated from said main shaft and having a rearwardly extending annular projection therefrom, a retaining ring secured to said rearward annular projection and retaining said worm wheel to said thrust block, and means for returning said shaft actuated as the presser head reaches its extreme forward position, substantially as descibed.

Signed at the town of Weyburn this 31st day of May 1907.

HARVEY NELSON BINGHAM.

Witnesses:
FRANK MOFFET,
GEO. M. BOWMAN.